United States Patent
Xu et al.

(10) Patent No.: US 8,993,032 B2
(45) Date of Patent: Mar. 31, 2015

(54) PROTEIN RECOVERY BEVERAGE

(75) Inventors: Liangji Xu, Naperville, IL (US); Vincent Rinaldi, Bethel, CT (US); Zeinab Ali, Crystal Lake, IL (US); Kelly Van Dyke, Bronx, NY (US); Andrew Damin, White Plains, NY (US)

(73) Assignee: Stokely-Van Camp, Inc., Chicago, IL (US)

( * ) Notice: Subject to any disclaimer, the term of this patent is extended or adjusted under 35 U.S.C. 154(b) by 235 days.

(21) Appl. No.: 12/969,221

(22) Filed: Dec. 15, 2010

(65) Prior Publication Data

US 2011/0151059 A1 Jun. 23, 2011

Related U.S. Application Data

(60) Provisional application No. 61/288,052, filed on Dec. 18, 2009.

(51) Int. Cl.
| | | |
|---|---|---|
| A23C 21/00 | (2006.01) | |
| A23L 2/00 | (2006.01) | |
| A23L 2/66 | (2006.01) | |
| A23L 1/305 | (2006.01) | |
| A23L 2/68 | (2006.01) | |

(52) U.S. Cl.
CPC .......... *A23L 2/66* (2013.01); *A23L 1/3056* (2013.01); *A23L 2/68* (2013.01); *A23V 2002/00* (2013.01)
USPC .......... 426/583; 426/580; 426/590; 426/656; 426/657

(58) Field of Classification Search
USPC .......................... 426/580, 583, 590, 656, 657
See application file for complete search history.

(56) References Cited

U.S. PATENT DOCUMENTS

| | | | |
|---|---|---|---|
| 3,773,961 A | 11/1973 | Gordon | |
| 3,904,771 A | 9/1975 | Donnelly et al. | |
| 3,950,547 A | 4/1976 | Lamar, III et al. | |
| 4,309,417 A | 1/1982 | Staples | |
| 5,032,411 A | 7/1991 | Stray-Gundersen | |
| 5,104,674 A | 4/1992 | Chen et al. | |
| 5,571,783 A | 11/1996 | Montagne et al. | |
| 6,039,985 A | 3/2000 | Kamarei | |
| 6,106,874 A | 8/2000 | Liebrecht et al. | |
| 6,156,332 A | 12/2000 | Bakal et al. | |
| 6,180,159 B1 | 1/2001 | Villagran et al. | |
| 6,309,663 B1 | 10/2001 | Patel et al. | |
| 6,358,544 B1 | 3/2002 | Henry, Jr. et al. | |
| 6,475,539 B1 | 11/2002 | DeWille et al. | |
| 6,592,863 B2 | 7/2003 | Fuchs et al. | |
| 6,613,367 B1 | 9/2003 | Wells et al. | |
| 6,616,955 B2 | 9/2003 | Nunes et al. | |
| 6,632,449 B2 | 10/2003 | Niehoff | |
| 6,849,595 B2 | 2/2005 | Mark et al. | |
| 6,989,171 B2 | 1/2006 | Portman | |
| 7,205,018 B2 | 4/2007 | Sherwood et al. | |
| 7,396,552 B2 | 7/2008 | Ogasawara et al. | |
| 7,476,399 B2 | 1/2009 | Tachdjian et al. | |
| 7,615,245 B2 | 11/2009 | Sweeney et al. | |
| 7,662,419 B2 | 2/2010 | Ojima et al. | |
| 2003/0059514 A1 | 3/2003 | Villagran et al. | |
| 2003/0099753 A1 | 5/2003 | Yang | |
| 2003/0134007 A1 | 7/2003 | Donhowe | |
| 2003/0211204 A1 | 11/2003 | Fields et al. | |
| 2004/0096547 A1 | 5/2004 | Ferruzzi | |
| 2004/0105923 A1 | 6/2004 | O'Connell | |
| 2004/0253227 A1 | 12/2004 | Martin et al. | |
| 2005/0136169 A1 | 6/2005 | Haung et al. | |
| 2006/0121172 A1 | 6/2006 | Portman | |
| 2006/0172058 A1 | 8/2006 | Achs | |
| 2006/0286259 A1 | 12/2006 | Hargreaves | |
| 2007/0014910 A1 | 1/2007 | Altemueller et al. | |
| 2007/0085058 A1 | 4/2007 | Mora-Gutierrez et al. | |
| 2007/0116819 A1 | 5/2007 | Prakash et al. | |
| 2007/0116828 A1 | 5/2007 | Prakash et al. | |
| 2007/0148305 A1 | 6/2007 | Sherwood et al. | |

(Continued)

FOREIGN PATENT DOCUMENTS

| | | |
|---|---|---|
| AU | 2010331939 | 6/2011 |
| CN | 1671300 | 9/2005 |

(Continued)

OTHER PUBLICATIONS

International Preliminary Report on Patentability and Written Opinion in related International Patent Application No. PCT/US2010/060511 dated Jun. 19, 2012.
Search Report and Written Opinion in related International Patent Application No. PCT/US2010/060511, dated Mar. 7, 2011.
XP002623894, Anonymous, "Sports Drink," retrieved from www.gnpd.com, Dec. 2006.
XP002623896, Anonymous, "Protein Blast Supplement Drink," retrieved from www.gnpd.com, Feb. 2002.
XP002623898, Anonymous, "Drink Extensions," retrieved from www.gnpd.com, Nov. 2002.
XP002623893, Anonymous, "Supreme Whey Shot," retrieved from www.gnpd.com, Oct. 2009.

(Continued)

*Primary Examiner* — Leslie Wong
(74) *Attorney, Agent, or Firm* — Banner & Witcoff, Ltd.

(57) ABSTRACT

A protein rehydration/recovery beverage composition is provided, including an aqueous component such as water, hydrolyzed protein, and sodium acid sulfate and at least one other edible acid. The hydrolyzed protein may be hydrolyzed whey and optionally hydrolyzed collagen. In addition, the beverage composition may include at least one carbohydrate, such as sucrose, and one or more non-nutritive sweeteners. A protein rehydration/recovery beverage composition is provided, including an aqueous component, hydrolyzed proteins and an acid blend. The acid blend contains a first acid component including at least one of phosphoric acid and citric acid, and a second acid component including at least one of tartaric acid, fumaric acid, malic acid, gluconic acid, ascorbic acid, and lactic acid. Also, a method for making a protein recovery beverage composition that has a pH of less than about 4.2. The rehydration/recovery beverage is stable and clean tasting, and has a low viscosity.

12 Claims, No Drawings

(56) References Cited

U.S. PATENT DOCUMENTS

| | | |
|---|---|---|
| 2007/0148307 A1 | 6/2007 | Sherwood et al. |
| 2007/0154614 A1 | 7/2007 | Sherwood et al. |
| 2007/0212460 A1 | 9/2007 | Inoue et al. |
| 2007/0225348 A1 | 9/2007 | Edens et al. |
| 2008/0050407 A1 | 2/2008 | Haas |
| 2008/0050497 A1 | 2/2008 | Mai et al. |
| 2008/0081087 A1 | 4/2008 | Berry et al. |
| 2008/0095826 A1 | 4/2008 | Uneyama et al. |
| 2008/0107775 A1 | 5/2008 | Prakash et al. |
| 2008/0107776 A1 | 5/2008 | Prakash et al. |
| 2008/0107787 A1 | 5/2008 | Prakash et al. |
| 2008/0108710 A1 | 5/2008 | Prakash et al. |
| 2008/0160091 A1 | 7/2008 | Kropf et al. |
| 2008/0193596 A1 | 8/2008 | Hausmanns et al. |
| 2008/0268038 A1 | 10/2008 | Wolfe |
| 2008/0286421 A1 | 11/2008 | DeLease et al. |
| 2008/0292765 A1 | 11/2008 | Prakash et al. |
| 2008/0305052 A1 | 12/2008 | Ley et al. |
| 2008/0305151 A1 | 12/2008 | Sakai et al. |
| 2009/0004360 A1 | 1/2009 | Bingley et al. |
| 2009/0012001 A1 | 1/2009 | Somoto et al. |
| 2009/0041911 A1 | 2/2009 | Gamay et al. |
| 2009/0047396 A1 | 2/2009 | Ikeda |
| 2009/0053378 A1 | 2/2009 | Prakash et al. |
| 2009/0104330 A1 | 4/2009 | Zasypkin |
| 2009/0155363 A1 | 6/2009 | Maibach |
| 2009/0162483 A1 | 6/2009 | Constantine et al. |
| 2009/0162485 A1 | 6/2009 | Schmitt et al. |
| 2009/0162486 A1 | 6/2009 | Kowalczyk et al. |
| 2009/0162487 A1 | 6/2009 | Bell et al. |
| 2010/0256058 A1 | 10/2010 | Ivy |

FOREIGN PATENT DOCUMENTS

| | | |
|---|---|---|
| EP | 1 541 042 | 6/2005 |
| GB | 2 335 134 | 9/1999 |
| WO | 2004010796 | 2/2004 |
| WO | 2004/045313 | 6/2004 |

OTHER PUBLICATIONS

XP002623897, Anonymous, "Hydrolyzed Collagen Drink," retrieved from www.gnpd.com, Nov. 2008.

XP002623895, Anonymous, "Green Tea & Lime Flavored Drink Mix," retrieved from www.gnpd.com, Aug. 2009.

Russian Application No. 2012124905 Office Action dated Apr. 23, 2013.

China Application No. 201080061505.9 Office Action mailed May 14, 2013.

China Application No. 201080061505.9 Office Action mailed Jan. 8, 2014.

Mexico Application No. MX/a/2012/006923 Office Action mailed Dec. 12, 2013.

though Am. J. Clin. Nutr., 2007; 86:373-381.) Research has also shown that

PROTEIN RECOVERY BEVERAGE

CROSS REFERENCE TO RELATED APPLICATIONS

This application claims priority to Provisional Application, U.S. Ser. No. 61/288,052, filed on Dec. 18, 2009, which is incorporated herein by reference in its entirety.

FIELD OF THE INVENTION

This invention relates to recovery and rehydration beverages (e.g., sports drinks) comprising both protein and electrolytes.

BACKGROUND

It has long been known to produce beverages of various formulations. Improved and new formulations are desirable to achieve desired nutritional characteristics, flavor, shelf life, and other objectives. For example, it would be desirable to provide a rehydration beverage that comprises protein.

Rehydration beverages may be used in conjunction with physical activity, such as exercise, to replenish fluids and electrolytes lost during the activity as well as to provide additional energy. To this end, rehydration beverages typically comprise at least water, carbohydrates and electrolytes.

In addition to electrolytes and carbohydrates, it may be desirable to consume protein following physical activity. Many protein beverages, however, are provided in the form of a shake or other product having a high viscosity. Consumption of such thick beverages may result in an undesirable feeling of fullness by the subject, leading the subject to consume an insufficient amount of the beverage to achieve complete rehydration or recovery. Moreover, intact proteins are typically sensitive to both heat and acidity, thus it would be desirable to employ a protein that can withstand processing and storage conditions in a recovery beverage composition.

It is an object of the invention to provide rehydration/recovery beverage compositions containing electrolytes and protein, which are easy to drink in sufficient quantities to achieve rehydration/recovery (e.g., are gulpable). Water, carbohydrates, and electrolytes are essential for re-hydration and re-energizing post workout. In particular, protein is important for post exercise muscle recovery. There are research articles regarding how protein intake following exercise can support muscle protein synthesis and inhibit protein breakdown under certain circumstances. In addition, certain amino acids may regulate key signaling pathways for protein translation. (See Wolfe, R. R., *J. Nutr.*, 2006; 136:525 S-528S; Wolfe, R. R., *J. Nutr.*, 2002; 132:3219 S-3224S; Kimball & Jefferson, *Am. J. Clin. Nutr.*, 2006; 83:500 S-5007S, and Hartman et al., *Am. J. Clin. Nutr.*, 2007; 86:373-381.) Research has also shown that the essential amino acid component of protein is capable of driving muscle protein synthesis to result in a net positive muscle protein balance following resistance exercise. (See Tipton et al., *Am. J. Physiol.*, 1999; 276:E628-E634 and Volpi et al., *Am. J. Clin. Nutr.*, 2003; 78:250-258.)

As little as six grams of essential amino acids may stimulate the positive protein balance after exercise, when ingested within three hours of the exercise. (See Rasmussen et al., *J. Appl. Physiol.*, 2000; 88:386-392.) Twenty grams of intact, high quality protein has been suggested to be the maximum effective amount for stimulating muscle protein synthesis, whereas consuming greater amounts provides no additional benefit. (See Moore et al., *Am. J. Clin. Nutr.*, 2009; 89:161-168; Koopman et al., *Am. J. Physiol.*, 2007; 293:E833-E842; Tang et al., *Appl. Physiol. Nutr. Metab.*, 2007; 32:1132-1138; and Levenhagen et al., *Med. Sci. Sports Exerc.*, 2002; 34(5): 828-837.) The consumption of carbohydrates and essential amino acids together has been shown to induce a greater muscle protein synthesis than essential amino acids alone. (See Miller et al., *Med. Sci. Sports Exerc.*, 2003; 35:449-455 and Rasmussen et al., *J. Appl. Physiol.*, 2000; 88:386-392.)

It is a further object of the invention to provide substantially clear beverage compositions in which the protein is completely dissolved. It is another object of the invention to provide recovery beverage compositions comprising protein hydrolysates, which are relatively insensitive to heat and acidity. It is yet another object of the invention to provide good tasting rehydration/recovery beverages comprising hydrolyzed proteins, which do not exhibit bitter aftertastes. These and other objects, features and advantages of the invention or of certain embodiments of the invention will be apparent to those skilled in the art from the following disclosure and description of exemplary embodiments.

SUMMARY

In accordance with one aspect, a beverage composition is provided, comprising an aqueous component, hydrolyzed proteins and sodium acid sulfate. The aqueous component may comprise water. Further, the beverage optionally comprises sodium chloride and at least one other edible acid, such as phosphoric acid, citric acid, malic acid and/or citric acid. The beverage compositions may include at least one carbohydrate, such as sucrose. In addition, the beverage composition may include one or more non-nutritive sweeteners, such as Reb A, acesulfame potassium and/or sucralose.

In another aspect, a method for making a beverage composition is provided comprising combining, in any order, an aqueous component, hydrolyzed protein, and sodium acid sulfate, and optionally at least one other edible acid. The beverage composition comprises a pH of less than about 4.2. Further, the beverage compositions may include at least one carbohydrate, such as sucrose, as well as one or more non-nutritive sweeteners, for example Reb A, acesulfame potassium and/or sucralose.

In accordance with another aspect, a beverage composition is provided, comprising an aqueous component, hydrolyzed protein and an acid blend, wherein the beverage exhibits a bitterness of less than about 3, a tartness of between about 2 and about 6, and an astringency of less than about 3, as determined by a sensory panel using a scale of 0 to 7, wherein 0 corresponds to no detection and wherein 7 corresponds to high detection. The acid blend comprises a first acid component comprising at least one of phosphoric acid and citric acid, and a second acid component comprising at least one of tartaric acid, fumaric acid, malic acid, gluconic acid, ascorbic acid, and lactic acid. The aqueous component may comprise water. Further, the beverage optionally comprises a sodium source, a potassium source, or other mineral sources, and at least one carbohydrate, such as sucrose. In addition, the beverage composition may include one or more non-nutritive sweeteners, such as Reb A, acesulfame potassium and/or sucralose.

In another aspect, a method for making a beverage composition is provided comprising combining, in any order, an aqueous component, hydrolyzed protein, and an acid blend comprising at least one of phosphoric acid and citric acid, as well as at least one of tartaric acid, fumaric acid, malic acid, gluconic acid, ascorbic acid, and lactic acid. The beverage composition comprises a pH of less than about 4.2 and wherein the beverage exhibits a bitterness of less than about 3, a tartness of between about 2 and about 6, and an astringency of less than about 3, as determined by a sensory panel using a scale of 0 to 7, wherein 0 corresponds to no detection and wherein 7 corresponds to high detection.

In certain embodiments of the beverage compositions disclosed here, the weight ratio of the protein to carbohydrates is between about 0.5:1 and about 5:1, such as about 2:1, while in other embodiments the ratio is about 1:1. In embodiments the protein is provided by hydrolyzed whey, hydrolyzed collagen, or combinations thereof. In certain embodiments, the weight ratio of the hydrolyzed whey to hydrolyzed collagen is between about 50:50 and about 100:0. In certain exemplary embodiments of beverage compositions according to this disclosure, a substantially clear rehydration/recovery beverage with protein may be made with a turbidity of no more than 6 NTU (excluding any turbidity resulting from clouding agents and/or coloring), while in certain other embodiments the beverage has a turbidity of no more than about 10 NTU (excluding turbidity resulting from clouding agents and/or coloring). The beverage compositions of the invention are stable and have a relatively low viscosity, allowing a subject to be able to consume enough of the beverage composition to achieve rehydration without experiencing the feeling of a full stomach.

It will be appreciated by those skilled in the art, given the benefit of the following description of certain exemplary embodiments of the beverages and other beverage products disclosed here, that at least certain embodiments of the invention have improved or alternative formulations suitable to provide desirable taste profiles, nutritional characteristics, etc. These and other aspects, features and advantages of the invention or of certain embodiments of the invention will be further understood by those skilled in the art from the following description of exemplary embodiments.

DETAILED DESCRIPTION OF EMBODIMENTS

It should be understood that beverage compositions and other beverage products in accordance with this disclosure may have any of numerous different specific formulations or constitutions. The formulation of a composition in accordance with this disclosure can vary to a certain extent, depending upon such factors as the product's intended market segment, its desired nutritional characteristics, flavor profile and the like. For example, it will generally be an option to add further ingredients to the formulation of a particular embodiment, including any of the formulations described below. Additional (i.e., more and/or other) sweeteners may be added, flavorings, vitamins, colorants, fruit products, tastants, masking agents and the like, and/or flavor enhancers typically can be added to any such formulations to vary the taste, mouthfeel, nutritional characteristics, etc. Based on the guidance provided herein, formulating such other products will be well within the ability of one skilled in the art of formulating food products; such products are also covered by the scope of this invention.

In embodiments of the present invention a recovery beverage composition is provided, which includes protein and electrolytes. The total amount of protein may be between about 2% by weight and about 15% by weight, or between about 2% and about 12% by weight, or between about 3% and about 10% by weight, or between about 3% and about 8% by weight, or about 3.6% protein by weight of the beverage composition. The protein comprises one or more protein hydrolysates. In certain embodiments, protein is provided by hydrolyzed whey and optionally hydrolyzed collagen. In other embodiments, the protein hydrolysate may be provided by other protein sources. In certain embodiments, hydrolyzed whey and hydrolyzed collagen are present in the composition in a weight ratio between about 50:50 and about 100:0, such as about 60:40, 70:30, or 80:20 hydrolyzed whey to hydrolyzed collagen. In alternate embodiments, hydrolyzed whey and hydrolyzed collagen are present in the composition in a weight ratio between about 50:50 and about 0:100, such as about 40:60, 30:70, or 20:80 hydrolyzed whey to hydrolyzed collagen.

Hydrolyzed whey and hydrolyzed collagen may each be obtained from any suitable source, for instance from Protica, Inc. (Whitehall, Pa.). Characteristics of the hydrolyzed protein will depend on various factors, for instance the source of the protein and the method and conditions by which the protein is hydrolyzed. For example, the taste of a particular protein hydrolysate can be significantly affected by the location at which the intact proteins are cleaved into peptides. Protein hydrolysis is generally achieved by reacting the intact protein with specific enzymes under time and temperature conditions to optimize the hydrolysis yield. Often, the resulting protein hydrolysates are filtered to remove free amino acids and large proteins. If hydrophobic amino acids or amino acids comprising sulfur are located at the ends of the hydrolyzed protein peptides, they will typically exhibit a more bitter flavor than peptides in which hydrophobic and sulfur-containing amino acids are located away from the ends of the peptides, such as closer to the middle of the peptides. In certain embodiments, the protein hydrolysates employed in the beverage compositions exhibit a clean taste substantially devoid of bitterness.

Hydrolysis processing steps may also alter the pH of the protein hydrolysate, either increasing or decreasing the protein pH. In addition, the ionic charge of the peptides affects the ability of the hydrolyzed protein to act as a buffer. This is important when preparing a composition for which a particular pH level is desired. For example, a protein hydrolysate having a particular pH and a large buffering capacity that is added to a composition for which a different pH is desired will require the addition of greater amounts of acid or base to achieve the desired pH than a protein hydrolysate having less of a buffering capacity.

Hydrolyzed whey, in particular, tends to act as a strong buffering agent and to have a relatively high pH, therefore when hydrolyzed whey is to be employed in acidic compositions, it is necessary to add an acidulant to adjust the pH to a desired level, such as between about 2.5 and 4.2. Hydrolyzed collagen, in contrast, generally does not exhibit as much buffering capacity as hydrolyzed whey, thus by including hydrolyzed collagen in certain embodiments of the beverage composition, less acid is required to achieve the same pH level as in a beverage containing the same amount of protein but provided exclusively by hydrolyzed whey. Thus, in such embodiments, as more hydrolyzed whey protein is used, and less collagen is used or collagen is excluded altogether, there is a greater need for added compounds to reduce the pH of the beverage mixture.

Acid used in beverages disclosed herein can serve any one or more of several functions, including, for example, acting as a mild preservative by providing microbiological stability, providing antioxidant activity, lending tartness to the taste of the beverage, enhancing palatability, increasing thirst quenching effect, and modifying sweetness. Suitable edible acids may include, for example, phosphoric acid, citric acid, malic acid, tartaric acid, ascorbic acid, lactic acid, formic acid, fumaric acid, gluconic acid, succinic acid, maleic acid, sodium acid sulfate and/or adipic acid. Phosphoric acid is a particularly effective acid, yet its use in beverage compositions is limited to particular maximum concentrations, or prohibited entirely, by regulatory agencies in some locations.

Surprisingly, it was discovered that employing sodium acid sulfate ($NaHSO_4$) in combination with hydrolyzed whey provides compositions exhibiting a clean taste profile, minimizing any perceived sour or bitter taste. Beverage compositions according to the present invention containing both hydrolyzed protein and sodium acid sulfate exhibit a desirable taste profile. In particular, the taste profile of a beverage composition may be analyzed by a sensory panel. Sensory panels are well known in the art, and comprise groups of trained testers who describe products on the basis of selected senses, such as taste, scent, feel, sound, and appearance. Typically, one or more particular attributes of interest are selected and rated by each member of the sensory panel, and the results are generally reported as an average rating.

For example, the beverage compositions comprising sodium acid sulfate according to embodiments of the invention exhibit a bitterness of less than about 3, a tartness of between about 2 and about 6, and an astringency of less than about 3, as determined by a sensory panel using a scale of 0 to 7, wherein 0 corresponds to no detection and wherein 7 corresponds to high detection. According to aspects of the invention, the beverage compositions comprising sodium acid sulfate exhibit a bitterness of less than about 3, or less than about 2, or less than about 1. According to aspects of the invention, the beverage compositions comprising sodium acid sulfate exhibit a tartness of between about 2 and about 6, or between about 2 and about 5, or between about 3 and about 6, or between about 3 and about 5. According to aspects of the invention, the beverage compositions comprising sodium acid sulfate exhibit an astringency of less than about 3, or less than about 2, or less than about 1.

The sodium acid sulfate has the dual purpose of acting as both an acidulant and an electrolyte source in rehydration beverage compositions, by providing the electrolyte sodium. Sodium acid sulfate has an acid strength similar to that of phosphoric acid, and is thus useful to overcome the buffering capacity of a protein/beverage mix. The flavor profile of sodium acid sulfate is tart, smooth and clean, lacking a bitter aftertaste. In certain exemplary embodiments of the invention, the acidulant comprises a combination of sodium acid sulfate, phosphoric acid and citric acid. Thus, addition of sodium acid sulfate not only provides sodium ion useful for a recovery and rehydration beverage, but also is a powerful acid that is effective for lowering the pH of the beverage while mitigating perceived bitterness or other negative tastes of the beverage. This is especially important and useful when creating a beverage with hydrolyzed protein. For example, hydrolyzed whey protein tends to have a high buffering capacity (thus requiring stronger acid treatment) and is more likely to have exposed hydrophobic amino acids in the protein that increase bitterness of the beverage.

Surprisingly, it was also discovered that employing a specific blend of acids in combination with hydrolyzed protein, such as hydrolyzed whey, hydrolyzed collagen, and combinations thereof, provides compositions exhibiting a clean taste profile, minimizing any perceived sour or bitter taste. The acid blend comprises a first acid component and a second acid component. The first acid component comprises at least one of phosphoric acid and citric acid, and the second acid component comprises at least one of tartaric acid, fumaric acid, malic acid, gluconic acid, ascorbic acid, and lactic acid. As discussed above, phosphoric acid is very effective at lowering pH, however its use in beverage compositions is limited or prohibited by regulatory agencies in some locations. Citric acid is also effective at lowering pH, yet in large amounts may impart a sour taste profile.

It was unexpectedly discovered that when a significant portion of the total acid required to decrease the pH of a beverage composition comprising hydrolyzed protein to less than 4.2 is provided by a first acid component comprising at least one of phosphoric acid and citric acid, plus a portion of the total acid is provided by a second acid component comprising at least one of tartaric acid, fumaric acid, malic acid, gluconic acid, ascorbic acid, and lactic acid, a desirable taste profile may be exhibited by the beverage composition. As discussed above, the taste profile of a beverage composition may be analyzed by a sensory panel.

The beverage compositions comprising a first acid component and a second acid component according to embodiments of the invention exhibit a bitterness of less than about 3, a tartness of between about 2 and about 6, and an astringency of less than about 3, as determined by a sensory panel using a scale of 0 to 7, wherein 0 corresponds to no detection and wherein 7 corresponds to high detection. According to aspects of the invention, the beverage compositions comprising a first acid component and a second acid component exhibit a bitterness of less than about 3, or less than about 2, or less than about 1. According to aspects of the invention, the beverage compositions comprising a first acid component and a second acid component exhibit a tartness of between about 2 and about 6, or between about 2 and about 5, or between about 3 and about 6, or between about 3 and about 5. According to aspects of the invention, the beverage compositions comprising a first acid component and a second acid component exhibit an astringency of less than about 3, or less than about 2, or less than about 1.

In one aspect, the first acid component comprising phosphoric acid, citric acid, or combinations thereof, may be employed to substantially adjust the pH, whereas the second acid component comprising tartaric acid, fumaric acid, malic acid, gluconic acid, ascorbic acid, lactic acid, or combinations thereof, may be employed in part to provide a desirable taste profile. As discussed above, the pH and buffering capacity of hydrolyzed proteins varies, based for instance on the protein source and method of hydrolysis and amount of protein. Consequently, the total amount of acid required to achieve a predetermined pH level will depend at least on the particular hydrolyzed protein present in the beverage composition. According to certain embodiments, the target pH of the beverage composition comprises between about 2.6 and about 4.2, or between about 3.6 and about 4.1, or about 3.9.

In certain aspects of the invention, the relative amounts of the first and second acid components in the acid blend are expressed in ratios. For example, in an embodiment the ratio of the first acid component (comprising at least one of phosphoric acid and citric acid) to the second acid component (comprising at least one of tartaric acid, fumaric acid, malic acid, gluconic acid, ascorbic acid, and lactic acid) ranges from about 1:4 to about 4:1, or about 1:3 to about 3:1, or from about 1:2 to about 2:1 or about 1:1. In one aspect, the ratio of the first acid component to the second acid component ranges from about 1:30 to about 2:1, or about 1:15 to about 2:1, or about 1:10 to about 2:1, or about 1:5 to about 2:1.

In alternate aspects, the relative amounts of the acids in the acid blend are expressed as weight percentages. For instance the first acid component may provide between about 30% and about 70% of the total acid in the acid blend and the second acid component may provide between about 70% and about 30% of the total acid in the acid blend. In an aspect, the phosphoric and/or citric acid provides about 50% of the total acid in the acid blend and the acid, fumaric acid, malic acid, gluconic acid, ascorbic acid, and/or lactic acid provides about 50% of the total acid in the acid blend. In certain aspects, the first acid component provides between about 10% and about 50% of the total acid blend and the second acid component provides between about 50% and about 90% of the total acid blend.

In certain aspects of the invention, the acid blend is expressed as relative to the total amount of protein in the beverage composition, such as the amount of hydrolyzed whey. For example, in an embodiment, the first acid component (comprising at least one of phosphoric acid and citric acid) is present in the beverage composition in an amount of between about 0.04 weight percent and about 0.5 weight percent per 1 weight percent of hydrolyzed whey, or between about 0.05 weight percent and about 0.2 weight percent per 1 weight percent of hydrolyzed whey, or between about 0.06 weight percent and about 0.1 weight percent per 1 weight percent of hydrolyzed whey. In such an embodiment, the second acid component (comprising at least one of tartaric acid, fumaric acid, malic acid, gluconic acid, ascorbic acid, and lactic acid) is present in the beverage composition in an amount of between about 0.05 weight percent and about 0.8 weight percent per 1 weight percent of hydrolyzed whey, or between about 0.06 weight percent and about 0.5 weight percent per 1 weight percent of hydrolyzed whey, or between about 0.07 weight percent and about 0.3 weight percent per 1 weight percent of hydrolyzed whey.

The acid can be used in dry or solution form, for example, and in an amount sufficient to provide the desired pH of the beverage. Typically, for example, the one or more acids of the acidulant are used in amount, collectively, of from about 0.01% to about 1.0% by weight of the beverage, e.g., from about 0.05% to about 0.70% by weight of the beverage, such as 0.1% to 0.55% by weight of the beverage, depending upon the acidulant used, desired pH, other ingredients used, etc.

In certain embodiments, the protein is completely dissolved in the beverage composition, which exhibits a relatively low viscosity, such that a sufficient amount of the composition may be consumed to achieve recovery prior to resulting in a feeling of satiety, or fullness. In other embodiments, the protein may be mostly dissolved in the beverage, or other ingredients in the beverage composition may provide increased viscosity to the finished composition. Typically, the beverage compositions exhibit a measured viscosity of no more than about 10 centipoises (cps). In certain embodiments, the measured viscosity is less than 8 cps, less than 7 cps, or less than 6 cps.

Beverage compositions according to different embodiments may comprise an aqueous component, protein, acidulant and one or more carbohydrate source(s). In certain embodiments, the carbohydrates may include sources of monosaccharides, disaccharides and glucooligosaccharides, while in other embodiments the carbohydrates also include sources of polysaccharides, for example corn syrup solids. In certain embodiments, a beverage composition is provided that comprises a weight ratio of protein to carbohydrates of between about 0.5:1 and about 5:1, such as about 2:1, or about 1:1. As discussed above, the presence of carbohydrates may enhance the uptake of the amino acids from the protein when the composition is ingested following physical exercise. Accordingly, certain embodiments of the invention comprise both protein and carbohydrates. The rehydration beverage compositions may further include electrolytes, coloring agents, flavoring agents, vitamins, functional ingredients and combinations thereof.

In embodiments providing a packaged ready-to-drink beverage, the beverage composition may be pre-mixed with a liquid such as water. In certain embodiments, the ready-to-drink beverage comprises about 80-99 weight percent (wt %) of liquid of the total weight of the beverage. Unless otherwise specified, all weight percentages are based on the total weight of a ready-to-drink beverage. In further embodiments, the beverage composition can be packaged as an edible composition or concentrate, such as a dry mix (e.g., powder) or a liquid concentrate for later reconstitution with one or more liquids to form a beverage. The concentrated composition may be associated with instructions for preparing the beverage composition. In another embodiment, a beverage concentrate may be packaged as gels, capsules, or tablets which are consumed with liquid. When provided in these forms, the beverage composition may comprise instructions to mix or consume with an amount of liquid which is equal to about 80-99 wt % of the prepared beverage composition.

In general, a rehydration/recovery beverage in accordance with this disclosure typically comprises at least an aqueous component such as water, hydrolyzed protein, one or more carbohydrates, electrolytes, acidulant and flavoring. Exemplary flavorings which may be suitable for at least certain formulations in accordance with this disclosure include citrus flavoring, spice flavorings and others. Preservatives can be added if desired, depending upon the other ingredients, production technique, desired shelf life, etc. Additional and alternative suitable ingredients will be recognized by those skilled in the art given the benefit of this disclosure.

At least certain exemplary embodiments of the beverage concentrates contemplated are prepared with an initial volume of water to which the additional ingredients are added. Full strength beverage compositions can be formed from the beverage concentrate by adding further volumes of water to the concentrate. Typically, for example, full strength beverages can be prepared from the concentrates by combining approximately 1 part concentrate with between approximately 3 to approximately 9 parts water. In certain exemplary embodiments the full strength beverage is prepared by combining 1 part concentrate with 5 parts water. In certain exemplary embodiments the additional water used to form the full strength beverages is carbonated water. In certain other embodiments, a full strength beverage is directly prepared without the formation of a concentrate and subsequent dilution.

Water is a basic ingredient of the aqueous component of beverages disclosed here, typically being the vehicle or primary liquid portion in which the remaining ingredients are dissolved, emulsified, suspended or dispersed. Purified water can be used in the manufacture of certain embodiments of the beverages disclosed here, and water of a standard beverage quality can be employed in order not to adversely affect beverage taste, odor, or appearance. The water typically will be clear, colorless, free from objectionable minerals, tastes and odors, free from organic matter, low in alkalinity and of acceptable microbiological quality based on industry and government standards applicable at the time of producing the beverage. In certain typical embodiments, water is present at a level of from about 80% to about 99.9% by weight of the beverage. In at least certain exemplary embodiments the water used in beverages and concentrates disclosed here is "treated water," which refers to water that has been treated to reduce the total dissolved solids of the water prior to optional supplementation, e.g., with calcium as disclosed in U.S. Pat. No. 7,052,725. Methods of producing treated water are known to those of ordinary skill in the art and include deionization, distillation, filtration and reverse osmosis ("r-o"), among others. The terms "treated water," "purified water,", "demineralized water," "distilled water," and "r-o water" are understood to be generally synonymous in this discussion, referring to water from which substantially all mineral content has been removed, typically containing no more than about 500 ppm total dissolved solids, e.g. 250 ppm total dissolved solids.

As used herein, "clear" refers to optical clarity, i.e., a beverage that is as clear as water. In one embodiment of the present invention, the beverage concentrate and/or the finished beverage are capable of being substantially clear, as evidenced by a reading by a turbidimeter of around 1 NTU (Nephelometric Turbidity Units) and not more than 3 NTU. In this aspect of the present invention, the base protein beverage mixture is substantially clear, but for any turbidity that may exist as a result of added components such as clouding agents and/or coloring. In other embodiments, the turbidity of the beverage may be in the range of about 5 to 10 NTU, and thus may appear slightly hazy or very slightly hazy. In certain other embodiments of the invention, the beverage composition has a turbidity of no more than about 10 NTU, or 20 NTU, or 30 NTU, but still has an appearance of a gulpable beverage, rather than a shake-like drink. Higher NTU values of such compositions may be increased by any of the ingredients of the beverage composition, such as but not limited to protein, colorants, clouding agents, flavor emulsions, and juices.

In embodiments of the invention, the beverage composition includes an electrolyte source for providing sodium (Na). Sodium may be provided by compounds of sodium, preferably including sodium acid sulfate, and also possibly including sodium chloride, sodium citrate, sodium carbonate, sodium bicarbonate, or combinations thereof. Moreover, sodium may also be provided by the protein, either naturally or by being incorporated into the protein during processing. The hydrolysis process and/or pH adjustment of the protein hydrolysate may also introduce added sodium, or other electrolytes, into the protein. Regardless of such additional sources of sodium, however, one beneficial aspect of the present invention is the use of sodium acid sulfate for certain useful properties while also providing sodium as an electrolyte to the consumer of the beverage to aid in recovery/rehydration. In select embodiments, the amount of sodium is about 0.005% by weight to about 0.06% by weight of the beverage. Other amounts may also be useful, depending on the application and other factors. In one embodiment, the sodium is provided by sodium acid sulfate and sodium chloride. As shown in the exemplary formulation in Table 1, the sodium acid sulfate and sodium chloride blend is 0.1316% by weight of the beverage composition. In certain embodiments, the sodium is provided in an amount of about 1000 mg per beverage serving.

Additional types of electrolyte sources to provide, for example, potassium (K), magnesium (Mg), calcium (Ca) and chloride (Cl) ions can also be included in the beverage composition in addition to or independently of sodium (Na). The different types of electrolytes can be provided by their compounds or a combination of their compounds. For example, the compounds can include potassium acetate, potassium bicarbonate, potassium bromide, potassium chloride, potassium citrate, potassium-D-gluconate, mono- and dibasic potassium phosphate, calcium acetate, calcium chloride, calcium citrate, calcium-D-gluconate, calcium lactate, calcium laevulinate, dibasic calcium phosphate, magnesium chloride, magnesium carbonate and magnesium sulphate, or a combination thereof. In one embodiment, the potassium ions are provided by monopotassium phosphate or dipotassium phosphate. Similar to sodium, calcium, magnesium and/or potassium may be provided by the protein. In certain exemplary embodiments, the potassium ions are provided by the hydrolyzed protein, for example in an amount of 30 mg or more per beverage serving.

Non-mineral nutritive compounds such as vitamins can be added to the beverage composition. Examples of non-mineral nutritional supplement ingredients are known to those of ordinary skill in the art and include, for example, antioxidants and vitamins, including Vitamins A, D, E (tocopherol), C (ascorbic acid), $B_1$ (thiamine), $B_2$ (riboflavin), $B_6$, $B_{12}$, and K, niacin, folic acid, biotin, and combinations thereof. The optional non-mineral nutritional supplements are typically present in amounts generally accepted under good manufacturing practices. Exemplary amounts are between about 1% and about 100% RDV, where such RDV are established. In certain exemplary embodiments the non-mineral nutritional supplement ingredient(s) are present in an amount of from about 5% to about 20% RDV, where established.

As used herein, "taste" refers to the overall perception of a balance of the sweet-tart-salty quality of the beverage composition, including a combination of sweetness-tartness-saltiness flavor perception, temporal effects of the flavor perception, i.e., on-set and duration, off-tastes, e.g. bitterness and metallic taste, residual perception (aftertaste) and tactile perception, e.g. body and thickness. As used herein, a "full-calorie" beverage formulation is one fully sweetened with a nutritive sweetener. The term "nutritive sweetener" refers generally to sweeteners which provide significant caloric content in typical usage amounts, e.g., more than about 5 calories per 8 oz. serving of beverage. As used herein, a "potent sweetener" means a sweetener which is at least twice as sweet as sugar, that is, a sweetener which on a weight basis requires no more than half the weight of sugar to achieve an equivalent sweetness. For example, a potent sweetener may require less than one-half the weight of sugar to achieve an equivalent sweetness in a beverage sweetened to a level of 10 degrees Brix with sugar. Potent sweeteners include both nutritive (e.g., Lo Han Guo juice concentrate) and non-nutritive sweeteners (e.g., typically, Lo Han Guo powder). In addition, potent sweeteners include both natural potent sweeteners (e.g., steviol glycosides, Lo Han Guo, etc.) and artificial potent sweeteners (e.g., neotame, etc.). However, for natural beverage products disclosed here, only natural potent sweeteners are employed. Commonly accepted potency figures for certain potent sweeteners include, for example,

| | |
|---|---|
| Cyclamate | 30 times as sweet as sugar |
| Stevioside | 100-250 times as sweet as sugar |
| Acesulfame-K | 200 times as sweet as sugar |
| Mogroside V | 100-300 times as sweet as sugar |
| Rebaudioside A | 150-300 times as sweet as sugar |
| Aspertame | 200 times as sweet as sugar |
| Saccharine | 300 times as sweet as sugar |
| Neohesperidin dihydrochalcone | 300 times as sweet as sugar |
| Sucralose | 600 times as sweet as sugar |
| Neotame | 8,000 times as sweet as sugar |

As used herein, a "non-nutritive sweetener" is one which does not provide significant caloric content in typical usage amounts, i.e., is one which imparts less than 5 calories per 8 oz. serving of beverage to achieve the sweetness equivalent of 10 Brix of sugar. As used herein, "reduced calorie beverage" means a beverage having at least a 25% reduction in calories per 8 oz. serving of beverage as compared to the full calorie version, typically a previously commercialized full-calorie version. As used herein, a "low-calorie beverage" has fewer than 40 calories per 8 oz. serving of beverage. As used herein, "zero-calorie" or "diet" means having less than 5 calories per serving, e.g., per 8 oz. for beverages.

Natural embodiments of the beverage products disclosed here are natural in that they do not contain anything artificial or synthetic (including any color additives regardless of source) that would not normally be expected to be in the food. As used herein, therefore, a "natural" beverage composition is defined in accordance with the following guidelines: Raw materials for a natural ingredient exists or originates in nature. Biological synthesis involving fermentation and enzymes can be employed, but synthesis with chemical reagents is not utilized. Artificial colors, preservatives, and flavors are not considered natural ingredients. Ingredients may be processed or purified through certain specified techniques including at least: physical processes, fermentation, and enzymolysis. Appropriate processes and purification techniques include at least: absorption, adsorption, agglomeration, centrifugation, chopping, cooking (baking, frying, boiling, roasting), cooling, cutting, chromatography, coating, crystallization, digestion, drying (spray, freeze drying, vacuum), evaporation, distillation, electrophoresis, emulsification, encapsulation, extraction, extrusion, filtration, fermentation, grinding, infusion, maceration, microbiological (rennet, enzymes), mixing, peeling, percolation, refrigeration/freezing, squeezing, steeping, washing, heating, mixing, ion exchange, lyophilization, osmose, precipitation, salting out, sublimation, ultrasonic treatment, concentration, flocculation, homogenization, reconstitution, enzymolysis (using enzymes found in nature). Processing aids (currently defined as substances used as manufacturing aids to enhance the appeal or utility of a food component, including clarifying agents, catalysts, flocculants, filter aids, and crystallization inhibitors, etc. See 21 CFR §170.3(o)(24)) are considered incidental additives and may be used if removed appropriately.

Sweeteners suitable for use in various embodiments of the beverages disclosed herein include nutritive and non-nutritive, natural and artificial or synthetic sweeteners. Suitable sweeteners and combinations of sweeteners are selected for the desired nutritional characteristics, functional characteristics, taste profile for the beverage, mouthfeel and other organoleptic factors. Non-nutritive artificial sweeteners suitable for at least certain exemplary embodiments include, for example, peptide based sweeteners, e.g., aspartame, neotame, and alitame, and non-peptide based sweeteners, for example, sodium saccharin, calcium saccharin, acesulfame (including but not limited to acesulfame potassium), cyclamate (including but not limited to sodium cyclamate and/or calcium cyclamate), neohesperidin dihydrochalcone, and sucralose. Alitame may be less desirable for caramel-containing beverages where it has been known to form a precipitate. In certain exemplary embodiments the beverage product employs aspartame as the sweetener, either alone or with other sweeteners. In certain other exemplary embodiments the sweetener comprises aspartame and acesulfame potassium. Other non-nutritive sweeteners suitable for at least certain exemplary embodiments include, for example, sorbitol, mannitol, xylitol, glycyrrhizin, neohesperidin dihydrochalcone, D-tagatose, erythritol, meso-erythritol, malitol, maltose, lactose, fructo-oligosaccharides, Lo Han Guo powder, steviol glycosides, e.g., rebaudiosides such as Rebaudioside A, stevioside, etc., xylose, arabinose, isomalt, lactitol, maltitol, trehalulose, and ribose, and protein sweeteners such as monatin, thaumatin, monellin, brazzein, L-alanine and glycine related compounds and mixtures of any of them. Lo Han Guo, steviol glycosides, e.g., rebaudiosides such as Rebaudioside A, stevioside, etc. and related compounds, as discussed further below, are natural non-nutritive potent sweeteners. It will be within the ability of those skilled in the art, given the benefit of this disclosure, to select suitable non-nutritive sweeteners (e.g., one or combination of non-nutritive sweeteners, either alone or together with nutritive sweetener) for a particular embodiment of the beverage products disclosed here.

In at least certain exemplary embodiments of the beverages disclosed here, the sweetener component can include nutritive, natural crystalline or liquid sweeteners such as sucrose, liquid sucrose, fructose, liquid fructose, glucose, liquid glucose, glucose-fructose syrup from natural sources such as apple, chicory, honey, etc., e.g., high fructose corn syrup, invert sugar, maple syrup, maple sugar, honey, brown sugar molasses, e.g., cane molasses, such as first molasses, second molasses, blackstrap molasses, and sugar beet molasses, sorghum syrup and/or others. Such sweeteners are present in at least certain exemplary embodiments in an amount of from about 0.1% to about 20% by weight of the beverage, such as from about 1% to about 4% by weight, depending upon the desired level of sweetness for the beverage. To achieve desired beverage uniformity, texture and taste, in certain exemplary embodiments of the natural beverage products disclosed here, standardized liquid sugars as are commonly employed in the beverage industry can be used. Typically such standardized sweeteners are free of traces of nonsugar solids which could adversely affect the flavor, color or consistency of the beverage.

The sweeteners are edible consumables suitable for consumption and for use in beverages. By "edible consumables" is meant a food or beverage or an ingredient of a food or beverage for human or animal consumption. The sweetener or sweetening agent used here and in the claims can be a nutritive or non-nutritive, natural or synthetic beverage ingredient or additive (or mixtures of them) which provides sweetness to the beverage, i.e., which is perceived as sweet by the sense of taste. The perception of flavoring agents and sweetening agents may depend to some extent on the interrelation of elements. Flavor and sweetness may also be perceived separately, i.e., flavor and sweetness perception may be both dependent upon each other and independent of each other. For example, when a large amount of a flavoring agent is used, a small amount of a sweetening agent may be readily perceptible and vice versa. Thus, the oral and olfactory interaction between a flavoring agent and a sweetening agent may involve the interrelationship of elements.

Non-nutritive, high potency sweeteners typically are employed at a level of milligrams per fluid ounce of beverage, according to their sweetening power, any applicable regulatory provisions of the country where the beverage is to be marketed, the desired level of sweetness of the beverage, etc. It will be within the ability of those skilled in the art, given the benefit of this disclosure, to select suitable additional or alternative sweeteners for use in various embodiments of the beverage products disclosed here.

As mentioned above, at least certain exemplary embodiments of the beverages disclosed here employ steviol glycosides, e.g., rebaudiosides such as Rebaudioside A, stevioside, etc. or related compounds or mixtures of any of them for sweetening. These compounds can be obtained by extraction or the like from the *stevia* plant. *Stevia* (e.g., *Stevia rebaudiana bectoni*) is a sweet-tasting plant. The leaves contain a complex mixture of natural sweet diterpene glycosides. Steviol glycosides, e.g., rebaudiosides such as Rebaudioside A, stevioside, etc. are components of *Stevia* that contribute sweetness. Typically, these compounds are found to include stevioside (4-13% dry weight), steviolbioside (trace), the rebaudiosides, including rebaudioside A (2-4%), rebaudioside B (trace), rebaudioside C (1-2%), rebaudioside D (trace), and rebaudioside E (trace), and dulcoside A (0.4-0.7%). The following nonsweet constituents also have been identified in the leaves of *stevia* plants: labdane, diterpene, triterpenes, sterols, flavonoids, volatile oil constituents, pigments, gums and inorganic matter. In at least certain embodiments of the beverage products disclosed herein, non-nutritive sweeteners steviol glycosides, e.g., rebaudiosides such as Rebaudioside A, stevioside, etc. may be included in ready to drink beverage compositions at a weight percent of about 0.1% to about 10.0%, and preferably between about 0.2% and about 0.75%.

The sweetener Lo Han Guo, which has various different spellings and pronunciations and is abbreviated here in some instances as LHG, can be obtained from fruit of the plant family Cucurbitaceae, tribe Jollifieae, subtribe Thladianthinae, genus *Siraitia*. LHG often is obtained from the genus/species *S. grosvenorii, S. siamensis, S. silomaradjae, S. sikkimensis, S. africana, S. borneensis*, and *S. taiwaniana*. Suitable fruit includes that of the genus/species *S. grosvenorii*, which is often called Lo Han Guo fruit. LHG contains triterpene glycosides or mogrosides, which constituents may be used as LHG sweeteners. Lo Han Guo is a potent sweetener which can be provided as a natural nutritive or natural non-nutritive sweetener. For example, Lo Han Guo juice concentrate may be a nutritive sweetener, and Lo Han Guo powder may be a non-nutritive sweetener. Lo Han Guo can be used as the juice or juice concentrate, powder, etc. Preferably LHG juice contains at least about 0.1%, e.g., from 0.1% to about 15%, mogrosides, preferably mogroside V, mogroside IV, (11-oxo-mogroside V), siamenoside and mixtures thereof. LHG can be produced, for example, as discussed in U.S. Pat. No. 5,411,755. Sweeteners from other fruits, vegetables or plants also may be used as natural or processed sweeteners or sweetness enhancers in at least certain exemplary embodiments of the beverages disclosed here.

Preservatives may be used in at least certain embodiments of the beverages disclosed here. That is, at least certain exemplary embodiments contain an optional dissolved preservative system. Solutions with a pH below 4 and especially those below 3 typically are "microstable," i.e., they resist growth of microorganisms, and so are suitable for longer term storage prior to consumption without the need for further preservatives. However, an additional preservative system can be used if desired. If a preservative system is used, it can be added to the beverage product at any suitable time during production, e.g., in some cases prior to the addition of the sweetener. As used here, the terms "preservation system" or "preservatives" include all suitable preservatives approved for use in food and beverage compositions, including, without limitation, such known chemical preservatives as benzoic acid, benzoates, e.g., sodium, calcium, and potassium benzoate, sorbates, e.g., sodium, calcium, and potassium sorbate, citrates, e.g., sodium citrate and potassium citrate, polyphosphates, e.g., sodium hexametaphosphate (SHMP), dimethyl dicarbonate, and mixtures thereof, and antioxidants such as ascorbic acid, EDTA, BHA, BHT, TBHQ, EMIQ, dehydroacetic acid, ethoxyquin, heptylparaben, and combinations thereof.

Preservatives can be used in amounts not exceeding mandated maximum levels under applicable laws and regulations. The level of preservative used typically is adjusted according to the planned final product pH, as well as an evaluation of the microbiological spoilage potential of the particular beverage formulation. The maximum level employed typically is about 0.05% by weight of the beverage. It will be within the ability of those skilled in the art, given the benefit of this disclosure, to select a suitable preservative or combination of preservatives for beverages according to this disclosure. In certain embodiments of the invention, benzoic acid or its salts (benzoates) may be employed as preservatives in the beverage products.

Other methods of beverage preservation suitable for at least certain exemplary embodiments of the beverage products disclosed here include, e.g., aseptic packaging and/or heat treatment or thermal processing steps, such as hot filling and tunnel pasteurization. Such steps can be used to reduce yeast, mold and microbial growth in the beverage products. For example, U.S. Pat. No. 4,830,862 to Braun et al. discloses the use of pasteurization in the production of fruit juice beverages as well as the use of suitable preservatives in carbonated beverages. U.S. Pat. No. 4,925,686 to Kastin discloses a heat-pasteurized freezable fruit juice composition which contains sodium benzoate and potassium sorbate. In general, heat treatment includes hot fill methods typically using high temperatures for a short time, depending on the composition pH, e.g., from about 180° F. to about 225° F. for 10 to 30 seconds, tunnel pasteurization methods typically using lower temperatures for a longer time, e.g., about 160° F. for 10-15 minutes, and retort methods typically using, e.g., about 250° F. for 3-5 minutes at elevated pressure, i.e., at pressure above 1 atmosphere.

The beverage products disclosed here optionally contain a flavor composition, for example, natural and synthetic fruit flavors, botanical flavors, other flavors, and mixtures thereof. As used here, the term "fruit flavor" refers generally to those flavors derived from the edible reproductive part of a seed plant. Included are both those wherein a sweet pulp is associated with the seed, e.g., banana, tomato, cranberry and the like, and those having a small, fleshy berry. The term berry also is used here to include aggregate fruits, i.e., not "true" berries, but that are commonly accepted as a berry. Also included within the term "fruit flavor" are synthetically prepared flavors made to simulate fruit flavors derived from natural sources. Examples of suitable fruit or berry sources include whole berries or portions thereof, berry juice, berry juice concentrates, berry purees and blends thereof, dried berry powders, dried berry juice powders, and the like.

Exemplary fruit flavors include the citrus flavors, e.g., orange, lemon, lime and grapefruit, and such flavors as apple, grape, cherry, and pineapple flavors and the like, and mixtures thereof. In certain exemplary embodiments the beverage concentrates and beverages comprise a fruit flavor component, e.g., a juice concentrate or juice. As used here, the term "botanical flavor" refers to flavors derived from parts of a plant other than the fruit. As such, botanical flavors can include those flavors derived from essential oils and extracts of nuts, bark, roots and leaves. Also included within the term "botanical flavor" are synthetically prepared flavors made to simulate botanical flavors derived from natural sources. Examples of such flavors include cola flavors, tea flavors, and the like, and mixtures thereof. The flavor component can further comprise a blend of various of the above-mentioned flavors. The particular amount of the flavor component useful for imparting flavor characteristics to the beverages of the present invention will depend upon the flavor(s) selected, the flavor impression desired, and the form of the flavor component. Those skilled in the art, given the benefit of this disclosure, will be readily able to determine the amount of any particular flavor component(s) used to achieve the desired flavor impression.

Other flavorings suitable for use in at least certain exemplary embodiments of the beverage products disclosed here include, e.g., spice flavorings, such as cassia, clove, cinnamon, pepper, ginger, vanilla spice flavorings, cardamom, coriander, root beer, sassafras, ginseng, and others. Numerous additional and alternative flavorings suitable for use in at least certain exemplary embodiments will be apparent to those skilled in the art given the benefit of this disclosure. Flavorings can be in the form of an extract, oleoresin, juice concentrate, bottler's base, or other forms known in the art. Flavor blends, for example, may comprise 5-100% flavor and 0-95% solvent. In at least certain exemplary embodiments, such spice or other flavors complement that of a juice or juice combination.

The one or more flavorings can be used in the form of an emulsion, a blend or a juice. A flavoring emulsion can be prepared by mixing some or all of the flavorings together, optionally together with other ingredients of the beverage, and an emulsifying agent. The emulsifying agent may be added with or after the flavorings mixed together. In certain exemplary embodiments the emulsifying agent is water-soluble. Exemplary suitable emulsifying agents include gum acacia, modified starch, carboxymethylcellulose, gum tragacanth, gum ghatti and other suitable gums. Additional suitable emulsifying agents will be apparent to those skilled in the art of beverage formulations, given the benefit of this disclosure. The emulsifier in exemplary embodiments comprises greater than about 3% of the mixture of flavorings and emulsifier. In certain exemplary embodiments the emulsifier is from about 5% to about 30% of the emulsion mixture.

The beverage concentrates and beverages disclosed here may contain additional ingredients, including, generally, any of those typically found in beverage formulations. These additional ingredients, for example, can typically be added to a stabilized beverage concentrate. Examples of such additional ingredients include, but are not limited to, caffeine, caramel and other coloring agents or dyes, antifoaming agents, gums, emulsifiers, tea solids and cloud components.

EXAMPLES

Example 1

A protein rehydration/recovery beverage composition was prepared according to the present invention. The particular ingredients and the weight percent of each ingredient included in the rehydration beverage composition are listed below in Table 1. The protein was provided by a blend of hydrolyzed whey and hydrolyzed collagen. The acid blend comprised phosphoric acid, citric acid, and sodium acid sulfate. The beverage composition comprised a pH of about 3.92, a titratable acidity of about 0.78, and a brix degree of about 7.61. The finished protein recovery beverage provided 1000 mg sodium and over 30 mg potassium per serving. The beverage composition was clear, stable, and exhibited no bitter aftertaste from the hydrolyzed protein.

TABLE 1

Formulation for a protein recovery beverage composition according to Example 1.

| Ingredient | Weight % in the Beverage Composition |
|---|---|
| Water | 91.8478 |
| Liquid Sucrose | 3.7037 |
| Phosphoric Acid | 0.2916 |
| Citric Acid, anhydrous | 0.1040 |
| Sodium Acid Sulfate / Sodium Chloride | 0.1316 |
| Sucralose (25%) | 0.0500 |
| Acesulfame Potassium | 0.0018 |

TABLE 1-continued

Formulation for a protein recovery beverage composition according to Example 1.

| Ingredient | Weight % in the Beverage Composition |
|---|---|
| Whey Protein Hydrolysate | 2.5200 |
| Hydrolyzed Collagen | 1.0842 |
| Color and Flavor Blend | 0.2623 |
| Antifoam | 0.0030 |
| TOTAL: | 100% |

Example 2

A protein rehydration/recovery beverage composition was prepared according to the present invention. The particular ingredients and the weight percent of each ingredient included in the rehydration beverage composition are listed below in Table 2. The protein was provided by a blend of hydrolyzed whey and hydrolyzed collagen. The acid blend included a first acid component comprising phosphoric acid and citric acid, and a second acid component comprising malic acid. The ratio of the first acid component to the second acid component was about 1:1.41. The beverage composition comprised a pH of about 3.9. The finished protein recovery beverage provided 1000 mg sodium and over 30 mg potassium per serving. The beverage composition was clear, stable, and exhibited no bitter aftertaste from the hydrolyzed protein.

TABLE 2

Formulation for a protein recovery beverage composition according to Example 2.

| Ingredient | Weight % in the Beverage Composition |
|---|---|
| Water | 93.0207 |
| Dry Sucrose | 2.5000 |
| Phosphoric Acid (75%) | 0.0900 |
| Citric Acid, anhydrous | 0.1040 |
| Malic Acid | 0.2420 |
| Sodium Chloride | 0.0822 |
| Sucralose (25%) | 0.0400 |
| Acesulfame Potassium | 0.0018 |
| Whey Protein Hydrolysate | 2.5200 |
| Hydrolyzed Collagen | 1.0840 |
| Color and Flavor Blend | 0.3123 |
| Antifoam | 0.0030 |
| TOTAL: | 100% |

Example 3

A protein rehydration/recovery beverage composition was prepared according to the present invention. The particular ingredients and the weight percent of each ingredient included in the rehydration beverage composition are listed below in Table 3. The protein was provided by a blend of hydrolyzed whey and hydrolyzed collagen. The acid blend included a first acid component comprising phosphoric acid and citric acid, and a second acid component comprising fumaric acid. The ratio of the first acid component to the second acid component was about 1:1.11. The beverage composition comprised a pH of about 3.9. The finished protein recovery beverage provided 1000 mg sodium and over 30 mg potassium per serving. The beverage composition was clear, stable, and exhibited no bitter aftertaste from the hydrolyzed protein.

TABLE 3

Formulation for a protein recovery beverage composition according to Example 3.

| Ingredient | Weight % in the Beverage Composition |
| --- | --- |
| Water | 93.0767 |
| Dry Sucrose | 2.5000 |
| Phosphoric Acid (75%) | 0.0900 |
| Citric Acid, anhydrous | 0.1040 |
| Fumaric Acid | 0.1900 |
| Sodium Chloride | 0.0822 |
| Sucralose (25%) | 0.0400 |
| Acesulfame Potassium | 0.0018 |
| Whey Protein Hydrolysate | 2.5200 |
| Hydrolyzed Collagen | 1.0800 |
| Color and Flavor Blend | 0.3123 |
| Antifoam | 0.0030 |
| TOTAL: | 100% |

Example 4

A protein rehydration/recovery beverage composition was prepared according to the present invention. The particular ingredients and the weight percent of each ingredient included in the rehydration beverage composition are listed below in Table 4. The protein was provided by a blend of hydrolyzed whey and hydrolyzed collagen. The acid blend included a first acid component comprising phosphoric acid and citric acid, and a second acid component comprising tartaric acid. The ratio of the first acid component to the second acid component was about 1:1.35. The beverage composition comprised a pH of about 3.9. The finished protein recovery beverage provided 1000 mg sodium and over 30 mg potassium per serving. The beverage composition was clear, stable, and exhibited no bitter aftertaste from the hydrolyzed protein.

TABLE 4

Formulation for a protein recovery beverage composition according to Example 4.

| Ingredient | Weight % in the Beverage Composition |
| --- | --- |
| Water | 93.0307 |
| Dry Sucrose | 2.5000 |
| Phosphoric Acid (75%) | 0.0900 |
| Citric Acid, anhydrous | 0.1040 |
| Tartaric Acid | 0.2320 |
| Sodium Chloride | 0.0822 |
| Sucralose (25%) | 0.0400 |
| Acesulfame Potassium | 0.0018 |
| Whey Protein Hydrolysate | 2.5200 |
| Hydrolyzed Collagen | 1.0840 |
| Color and Flavor Blend | 0.3123 |
| Antifoam | 0.0030 |
| TOTAL: | 100% |

Example 5

A protein rehydration/recovery beverage composition was prepared according to the present invention. The particular ingredients and the weight percent of each ingredient included in the rehydration beverage composition are listed below in Table 5. The protein was provided by hydrolyzed whey. The acid blend comprised phosphoric acid, citric acid, malic acid, and sodium acid sulfate. The beverage composition comprised a pH of about 3.95. The finished protein recovery beverage provided 1000 mg sodium and over 30 mg potassium per serving. The beverage composition was clear, stable, and exhibited no bitter aftertaste from the hydrolyzed protein.

TABLE 5

Formulation for a protein recovery beverage composition according to Example 5.

| Ingredient | Weight % in the Beverage Composition |
| --- | --- |
| Water | 92.722 |
| Dry Sucrose | 2.531 |
| Phosphoric Acid (75%) | 0.093 |
| Citric Acid, anhydrous | 0.105 |
| Malic Acid | 0.297 |
| Sodium Acid Sulfate/Sodium Chloride | 0.178 |
| Sucralose (25%) | 0.051 |
| Acesulfame Potassium | 0.002 |
| Whey Protein Hydrolysate | 3.652 |
| Color and Flavor Blend | 0.366 |
| Antifoam | 0.003 |
| TOTAL: | 100% |

Example 6

A protein rehydration/recovery beverage composition was prepared according to the present invention. The particular ingredients and the weight percent of each ingredient included in the rehydration beverage composition are listed below in Table 6. The protein was provided by hydrolyzed whey. The acid blend comprised phosphoric acid, citric acid, tartaric acid, and sodium acid sulfate. The beverage composition comprised a pH of about 3.91. The finished protein recovery beverage provided 1000 mg sodium and over 30 mg potassium per serving. The beverage composition was clear, stable, and exhibited no bitter aftertaste from the hydrolyzed protein.

TABLE 6

Formulation for a protein recovery beverage composition according to Example 6.

| Ingredient | Weight % in the Beverage Composition |
| --- | --- |
| Water | 92.768 |
| Dry Sucrose | 2.532 |
| Phosphoric Acid (75%) | 0.093 |
| Citric Acid, anhydrous | 0.105 |
| Tartaric Acid | 0.248 |
| Sodium Acid Sulfate/Sodium Chloride | 0.178 |
| Sucralose (25%) | 0.051 |
| Acesulfame Potassium | 0.002 |
| Whey Protein Hydrolysate | 3.654 |
| Color and Flavor Blend | 0.366 |
| Antifoam | 0.003 |
| TOTAL: | 100% |

Example 7

A protein rehydration/recovery beverage composition was prepared according to the present invention. The particular ingredients and the weight percent of each ingredient included in the rehydration beverage composition are listed below in Table 7. The protein was provided by hydrolyzed collagen. The acid blend comprised phosphoric acid, citric acid, malic acid, and sodium acid sulfate. The beverage composition comprised a pH of about 3.23. The finished protein recovery beverage provided 1000 mg sodium and over 30 mg potassium per serving. The beverage composition was clear, stable, and exhibited no bitter aftertaste from the hydrolyzed protein.

TABLE 7

Formulation for a protein recovery beverage composition according to Example 7.

| Ingredient | Weight % in the Beverage Composition |
|---|---|
| Water | 92.701 |
| Dry Sucrose | 2.531 |
| Phosphoric Acid (75%) | 0.093 |
| Citric Acid, anhydrous | 0.105 |
| Malic Acid | 0.320 |
| Sodium Acid Sulfate/Sodium Chloride | 0.178 |
| Sucralose (25%) | 0.051 |
| Acesulfame Potassium | 0.002 |
| Hydrolyzed Collagen | 3.652 |
| Color and Flavor Blend | 0.364 |
| Antifoam | 0.003 |
| TOTAL: | 100% |

Example 8

A protein rehydration/recovery beverage composition was prepared according to the present invention. The particular ingredients and the weight percent of each ingredient included in the rehydration beverage composition are listed below in Table 8. The protein was provided by hydrolyzed collagen. The acid blend comprised phosphoric acid, citric acid, tartaric acid, and sodium acid sulfate. The beverage composition comprised a pH of about 3.24. The finished protein recovery beverage provided 1000 mg sodium and over 30 mg potassium per serving. The beverage composition was clear, stable, and exhibited no bitter aftertaste from the hydrolyzed protein.

TABLE 8

Formulation for a protein recovery beverage composition according to Example 8.

| Ingredient | Weight % in the Beverage Composition |
|---|---|
| Water | 92.803 |
| Dry Sucrose | 2.533 |
| Phosphoric Acid (75%) | 0.093 |
| Citric Acid, anhydrous | 0.105 |
| Tartaric Acid | 0.209 |
| Sodium Acid Sulfate/Sodium Chloride | 0.178 |
| Sucralose (25%) | 0.051 |
| Acesulfame Potassium | 0.002 |
| Hydrolyzed Collagen | 3.656 |
| Color and Flavor Blend | 0.367 |
| Antifoam | 0.003 |
| TOTAL: | 100% |

Example 9

A protein rehydration/recovery beverage composition was prepared according to the present invention. The particular ingredients and the weight percent of each ingredient included in the rehydration beverage composition are listed below in Table 9. The protein was provided by hydrolyzed collagen. The acid blend comprised phosphoric acid, citric acid, and sodium acid sulfate. The beverage composition comprised a pH of about 3.81. The finished protein recovery beverage provided 1000 mg sodium and over 30 mg potassium per serving. The beverage composition was clear, stable, and exhibited no bitter aftertaste from the hydrolyzed protein.

TABLE 9

Formulation for a protein recovery beverage composition according to Example 9.

| Ingredient | Weight % in the Beverage Composition |
|---|---|
| Water | 92.998 |
| Liquid Sucrose | 2.539 |
| Phosphoric Acid (75%) | 0.093 |
| Citric Acid, anhydrous | 0.106 |
| Sodium Acid Sulfate/Sodium Chloride | 0.179 |
| Sucralose (25%) | 0.051 |
| Acesulfame Potassium | 0.002 |
| Hydrolyzed Collagen | 3.663 |
| Color and Flavor Blend | 0.366 |
| Antifoam | 0.003 |
| TOTAL: | 100% |

Example 10

A protein rehydration/recovery beverage composition was prepared according to the present invention, and tested by a sensory panel. The particular ingredients and the weight percent of each ingredient included in the rehydration beverage composition are listed below in Table 10. The protein was provided by a blend of hydrolyzed whey and hydrolyzed collagen. The acid blend included a first acid component comprising phosphoric acid and citric acid, and a second acid component comprising malic acid. The ratio of the first acid component to the second acid component was about 1:1.53. The beverage composition comprised a pH of about 3.95 and was clear and stable.

TABLE 10

Formulation for a protein recovery beverage composition according to Example 10.

| Ingredient | Weight % in the Beverage Composition |
|---|---|
| Water | 92.8706 |
| Dry Sucrose | 2.535 |
| Phosphoric Acid (75%) | 0.0927 |
| Citric Acid, anhydrous | 0.1056 |
| Malic Acid | 0.2678 |
| Sodium Chloride | 0.0476 |
| Sucralose (25%) | 0.0508 |
| Acesulfame Potassium | 0.0018 |
| Whey Protein Hydrolysate | 2.5578 |
| Hydrolyzed Collagen | 1.1004 |
| Color and Flavor Blend | 0.3669 |
| Antifoam | 0.0030 |
| TOTAL: | 100% |

The beverage composition prepared according to the formulation of Table 10 was taste tested by a sensory panel comprising ten testers. Each tester evaluated the beverage composition for the attributes of tartness, bitterness, and astringency and each attribute was assigned a designated number on a scale between 0 and 7. The scale includes the following ratings: 0 is rated as no detection of the attribute, 1 is rated as low detection of the attribute, 4 is rated as moderate detection of the attribute, and 7 is rated as high detection of the attribute. It will be appreciated by one of skill in the art that ratings of 2 and 3 describe attributes that fall between low detection and moderate detection, with a rating of 3 indicating a higher detection of the attribute than a rating of 2. Likewise, ratings of 5 and 6 describe attributes that fall between moderate detection and high detection, with a rating of 6 indicating a higher detection of the attribute than a rating of 5. The average rating from the sensory panel for each of the three attributes is provided below in Table 11.

TABLE 11

Average sensory panel rating of attributes of the beverage composition according to Example 10.

| Attribute | Average Rating (n = 10) |
| --- | --- |
| Tartness | 4.6 |
| Bitterness | 2.2 |
| Astringency | 2.5 |

Accordingly, the sensory panel testing determined that the beverage composition of Example 10 exhibited a tartness between about 2 and about 6 and more specifically between about 3 and about 5, a bitterness of less than about 3, and an astringency of less than about 3.

Example 11

A protein rehydration/recovery beverage composition was prepared according to the present invention. The particular ingredients and the weight percent of each ingredient included in the rehydration beverage composition are listed below in Table 12. The protein was provided by a blend of hydrolyzed whey and hydrolyzed collagen. The acid blend included a first acid component comprising phosphoric acid and citric acid, and a second acid component comprising tartaric acid. The ratio of the first acid component to the second acid component was about 1.1:1. The beverage composition comprised a pH of about 3.95 and was clear and stable.

TABLE 12

Formulation for a protein recovery beverage composition according to Example 11.

| Ingredient | Weight % in the Beverage Composition |
| --- | --- |
| Water | 92.9718 |
| Dry Sucrose | 2.5380 |
| Phosphoric Acid (75%) | 0.0928 |
| Citric Acid, anhydrous | 0.1057 |
| Tartaric Acid | 0.1589 |
| Sodium Chloride | 0.0477 |
| Sucralose (25%) | 0.0508 |
| Acesulfame Potassium | 0.0018 |
| Whey Protein Hydrolysate | 2.5606 |
| Hydrolyzed Collagen | 1.1016 |
| Color and Flavor Blend | 0.3673 |
| Antifoam | 0.0030 |
| TOTAL: | 100% |

The beverage composition prepared according to the formulation of Table 12 was taste tested by a sensory panel comprising ten testers as described above in Example 10. Each tester evaluated the beverage composition for the attributes of tartness, bitterness, and astringency and each attribute was assigned a designated number on a scale between 0 and 7. The average rating from the sensory panel for each of the three attributes is provided below in Table 13.

TABLE 13

Average sensory panel rating of attributes of the beverage composition according to Example 11.

| Attribute | Average Rating (n = 10) |
| --- | --- |
| Tartness | 2.3 |
| Bitterness | 1.9 |
| Astringency | 1.9 |

Accordingly, the sensory panel testing determined that the beverage composition of Example 11 exhibited a tartness between about 2 and about 5, a bitterness of less than about 2, and an astringency of less than about 2.

Example 12

A protein rehydration/recovery beverage composition was prepared according to the present invention. The particular ingredients and the weight percent of each ingredient included in the rehydration beverage composition are listed below in Table 14. The protein was provided by hydrolyzed whey. The acid blend included a first acid component comprising phosphoric acid and citric acid, and a second acid component comprising malic acid. The ratio of the first acid component to the second acid component was about 1:2.15. The beverage composition comprised a pH of about 3.95 and the beverage composition was clear and stable.

TABLE 14

Formulation for a protein recovery beverage composition according to Example 12.

| Ingredient | Weight % in the Beverage Composition |
| --- | --- |
| Water | 92.770 |
| Dry Sucrose | 2.532 |
| Phosphoric Acid (75%) | 0.093 |
| Citric Acid, anhydrous | 0.105 |
| Malic Acid | 0.376 |
| Sodium Chloride | 0.048 |
| Sucralose (25%) | 0.051 |
| Acesulfame Potassium | 0.002 |
| Whey Protein Hydrolysate | 3.654 |
| Color and Flavor Blend | 0.366 |
| Antifoam | 0.003 |
| TOTAL: | 100% |

The beverage composition prepared according to the formulation of Table 14 was taste tested by a sensory panel comprising ten testers as described above in Example 10. Each tester evaluated the beverage composition for the attributes of tartness, bitterness, and astringency and each attribute was assigned a designated number on a scale between 0 and 7. The average rating from the sensory panel for each of the three attributes is provided below in Table 15.

TABLE 15

Average sensory panel rating of attributes of the
beverage composition according to Example 12.

| Attribute | Average Rating (n = 10) |
| --- | --- |
| Tartness | 4.7 |
| Bitterness | 2.4 |
| Astringency | 2.8 |

Accordingly, the sensory panel testing determined that the beverage composition of Example 12 exhibited a tartness between about 2 and about 6 and more specifically between about 3 and about 5, a bitterness of less than about 3, and an astringency of less than about 3.

Example 13

A protein rehydration/recovery beverage composition was prepared according to the present invention. The particular ingredients and the weight percent of each ingredient included in the rehydration beverage composition are listed below in Table 16. The protein was provided by hydrolyzed collagen. The acid blend included a first acid component comprising phosphoric acid and citric acid, and a second acid component comprising malic acid. The ratio of the first acid component to the second acid component was about 1.75:1. The beverage composition comprised a pH of about 3.95 and was clear and stable.

TABLE 16

Formulation for a protein recovery beverage
composition according to Example 13.

| Ingredient | Weight % in the Beverage Composition |
| --- | --- |
| Water | 93.028 |
| Dry Sucrose | 2.539 |
| Phosphoric Acid (75%) | 0.093 |
| Citric Acid, anhydrous | 0.106 |
| Malic Acid | 0.099 |
| Sodium Chloride | 0.048 |
| Sucralose (25%) | 0.051 |
| Acesulfame Potassium | 0.002 |
| Hydrolyzed Collagen | 3.664 |
| Color and Flavor Blend | 0.367 |
| Antifoam | 0.003 |
| TOTAL: | 100% |

The beverage composition prepared according to the formulation of Table 16 was taste tested by a sensory panel comprising ten testers as described above in Example 10. Each tester evaluated the beverage composition for the attributes of tartness, bitterness, and astringency and each attribute was assigned a designated number on a scale between 0 and 7. The average rating from the sensory panel for each of the three attributes is provided below in Table 17.

TABLE 17

Average sensory panel rating of attributes of the
beverage composition according to Example 13.

| Attribute | Average Rating (n = 10) |
| --- | --- |
| Tartness | 1.8 |
| Bitterness | 1.9 |
| Astringency | 1.8 |

Accordingly, the sensory panel testing determined that the beverage composition of Example 13 exhibited a tartness between about 2 and about 5, a bitterness of less than about 2, and an astringency of less than about 2.

Given the benefit of the above disclosure and description of exemplary embodiments, it will be apparent to those skilled in the art that numerous alternate and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

The invention claimed is:

1. A beverage comprising:
an aqueous component comprising water in an amount of from 80% to 99.9% by weight of the beverage;
hydrolyzed protein in an amount of between 2% and 15% by weight of the beverage, the hydrolyzed protein comprising hydrolyzed whey;
sodium acid sulfate, and
acids consisting of at least two acids selected from the group consisting of citric acid, phosphoric acid, malic acid, tartaric acid, fumaric acid and combinations thereof;
wherein the beverage comprises a pH of between 3.6 and 4.1, exhibits a low viscosity of no more than 10 centipoises and a measured turbidity of value of between about 1 NTU and 3 NTU; and
wherein the beverage exhibits a bitterness of less than about 3, a tartness of between about 2 and about 6, and an astringency of less than about 3, as determined by a sensory panel using a scale of 0 to 7, wherein 0 corresponds to no detection and wherein 7 corresponds to high detection;
and wherein the low viscosity allows an individual to consume a sufficient amount of the beverage to achieve rehydration without experiencing the feeling of a full stomach.

2. The beverage of claim 1, wherein the hydrolyzed protein consists of hydrolyzed whey.

3. The beverage of claim 1, further comprising at least one carbohydrate.

4. The beverage of claim 3, wherein the weight ratio of protein to carbohydrate is between about 0.5:1 and 5:1.

5. The beverage of claim 1, wherein the hydrolyzed protein further comprises hydrolyzed collagen.

6. The beverage of claim 5, wherein the weight ratio of hydrolyzed whey to hydrolyzed collagen is between about 50:50 and about 100:0.

7. The beverage of claim 1, further comprising at least one non-nutritive sweetener.

8. The beverage of claim 7, wherein the at least one non-nutritive sweetener is selected from the group consisting of rebaudioside A, acesulfame potassium, sucralose, and combinations thereof.

9. The beverage of claim 1, further comprising a potassium source.

10. The beverage of claim 1, wherein the protein is present in an amount between about 3% and about 8% by weight.

11. The beverage of claim 1, comprising at least one other edible acid comprising phosphoric acid, citric acid, or combinations thereof.

12. The beverage of claim 1, wherein the beverage consists of water, hydrolyzed whey, hydrolyzed collagen, sodium acid sulfate, at least one carbohydrate, phosphoric acid, citric acid, sodium chloride, at least one non-nutritive sweetener, antifoam, coloring agents, and flavoring agents.

* * * * *